US006033519A

United States Patent [19]

[11] Patent Number: 6,033,519

[45] Date of Patent: Mar. 7, 2000

George

[54] METHOD OF PROTECTING WOODEN OBJECTS FROM DECAY

[75] Inventor: Richard Warrington George, Castlemorton, United Kingdom

[73] Assignee: Fenson & Company Limited, Worcestershire, United Kingdom

[21] Appl. No.: 09/129,992

[22] Filed: Aug. 6, 1998

[30] Foreign Application Priority Data

Aug. 6, 1997 [GB] United Kingdom .................. 9716524

[51] Int. Cl.[7] .............................. B32B 11/00; B05D 3/02

[52] U.S. Cl. .......................... 156/337; 427/393; 427/397; 427/408; 427/441; 427/557; 427/348; 427/370

[58] Field of Search .................................... 427/393, 397, 427/408, 440, 441, 557, 370, 348; 156/337; 52/169.14, 170

[56] References Cited

U.S. PATENT DOCUMENTS

| | | | |
|---|---|---|---|
| 893,391 | 7/1908 | Sinclair | 427/397 |
| 2,109,508 | 3/1938 | Schmittutz . | |
| 2,875,020 | 2/1959 | Ring . | |
| 3,448,585 | 6/1969 | Vogelsang . | |
| 3,467,490 | 9/1969 | Sommer . | |
| 3,638,790 | 2/1972 | Schmid et al. . | |
| 3,923,198 | 12/1975 | Brochman | 220/359 |
| 3,930,790 | 1/1976 | Rogosch | 432/229 |
| 4,384,524 | 5/1983 | Simeth et al. | 101/232 |
| 4,708,527 | 11/1987 | Inhofe, Jr. et al. | 405/216 |
| 4,779,735 | 10/1988 | Kelso, Jr. . | |
| 4,908,085 | 3/1990 | Makus et al. . | |
| 4,961,978 | 10/1990 | Doheny, Jr. et al. | 428/40 |
| 5,138,806 | 8/1992 | Marx et al. | 52/170 |
| 5,368,909 | 11/1994 | Langdon et al. | 428/137 |
| 5,891,583 | 4/1999 | George | 428/490 |

FOREIGN PATENT DOCUMENTS

| | | |
|---|---|---|
| 1 211 787 | 3/1966 | Germany . |
| 937744 | 9/1963 | United Kingdom . |

*Primary Examiner*—Shrive Beck
*Assistant Examiner*—Michael Barr
*Attorney, Agent, or Firm*—Young & Thompson

[57] ABSTRACT

The method includes the step of applying a heat shrinkable plastics sleeve to at least that part of the object most vulnerable to decay. A meltable sealing solution, typically a bituminous substance, is provided between the heat shrinkable plastics sleeve and the object. The sleeve is heated so as to melt the sealing solution sufficiently for it to bond intimately to the wooden object and pressure is applied to the plastics sleeve. The sleeve may be extruded and the sealing solution may be applied to the internal surface of the sleeve as it is extruded. Pressure can be applied to the sleeve using pressure pads, which may be heated, or by a jet of hot air.

12 Claims, No Drawings

METHOD OF PROTECTING WOODEN OBJECTS FROM DECAY

BACKGROUND OF THE INVENTION

This invention relates to a method of protecting wooden objects, particularly elongate ground contact objects such as fence posts and telephone and electricity poles, from decay.

Preservative treated fence posts despite advances in preservative technology are still prone to ground level decay. Typically, after 20 years service, 5%–30% of posts will be showing signs of decay at or below ground level, although this is to some extent dependent on ground conditions and standards of preservative treatment.

This is unfortunate as the other parts of the posts, i.e. those deep below ground and those well above ground, would give a typical life of 40–50 years or more.

The top portion of a fence post, i.e. that from approximately 50–75 mm above ground level, is exposed to natural air flow and sunlight which will ensure a typical moisture content of 15%–70%, dependent on weather conditions. These factors combined with preservative treatment should mean that decay is very rare.

The bottom portion of the post, i.e. that from approximately 300 mm below ground level, does not decay because of the very high moisture content (typically 30%–90%) and the compacted wet soil conditions will ensure minimum levels of oxygen which is vital for the growth of rotting organisms.

This leaves the middle portion from about 300 mm below ground level to about 75 mm above ground level where conditions are ideal for decay.

The fence post acts as a wick drawing up water and solids to a band at ground level where the water evaporates. This portion of the post is very damp, typically 30%–90% moisture content, and is exposed to ground and airborne microorganism which come into contact with the post and form primary moulds which are then followed by soft rots and Basidiomycetes.

Although preservatives greatly extend the life of fence posts (untreated posts typically last only 3–4 years), it is difficult to measure the standard of preservative treatment. Consequently, poor treatment can pass unnoticed.

Preservative belts, sleeves and wraps are also known. These relatively expensive products are predominantly used for the treatment of posts and poles in service, where their main purpose is to provide preservative material to replace that which may have been lost due to, inter alia, leaching. The sleeve wrap or belt provides additional preservative material at the outer face of the pole or post which is then absorbed, the objective being to totally penetrate the pole or post with preservative, hence eliminating decay.

GB-A-2297984 describes a method of protecting wooden objects from decay, the method comprising the step of applying a flexible outer barrier layer to at least that part of the object most vulnerable to decay, providing a bituminous substance between the barrier layer and the object and heating the barrier layer so as to melt the bituminous substance sufficiently for it to bond intimately to the wooden object. The barrier layer is in the form of heat shrinkable plastics material and is formed into, or is in the form of, a sleeve which is heat shrunk onto the object.

When applying the sleeve to smooth circular posts or poles using infra-red, or hot air, heating to heat shrink the sleeve onto the object, an excellent uniform bond is achieved between the bitumen and the post face. This bond is essential for the sleeve to work effectively.

However, it has been found that when the sleeve is heat shrunk onto square or other non-circular posts, the bitumen does not form a satisfactory seal. The present invention seeks to overcome this problem.

SUMMARY OF THE INVENTION

According to the present invention there is provided a method of protecting wooden objects from decay, comprising the step of applying a heat shrinkable plastics sleeve to at least that part of the object most vulnerable to decay, providing a meltable sealing solution between the heat shrinkable plastics sleeve and the object, heating the sleeve so as to melt the sealing solution sufficiently for it to bond intimately to the wooden object, and applying pressure to the plastics sleeve.

Preferably, the meltable sealing solution is a bituminous substance.

For the avoidance of doubt, the term "bituminous substance" used herein includes, for example, bitumen, tar, pitch, coal tar, asphalt, gilsonite, or any combination thereof in straight or modified form.

Typically, the bituminous substance may include wood preservatives and/or adhesion promoters.

Preferably, pressure pads are used to apply pressure to the sleeve. The pressure pads are, advantageously, heated, typically to a temperature in the range 150 to 200° C. The pads are typically formed of aluminium and are preferably faced with compressible material, such as silicone rubber, to allow for surface irregularities in the object. The pads, if heated, melt the sealing solution. They also apply pressure to the sleeve. Non-heated pressure pads could be used but in this case the pads should be pressed against the sleeve while it is still hot from heat shrinking.

Preferably, the sleeve is heated to melt the sealing solution and shrink the sleeve onto the object using infra-red heating. In this case, it is preferable that the pressure is subsequently applied such as using pressure pads or air at substantially room temperature to effect a bond. When using air to apply pressure, it has again been found that the minimum effective pressure at the sleeve face should be 5 millibars to give adequate bonding.

Alternatively, a jet of hot air may used to simultaneously heat the sleeve (to melt the sealing solution and heat shrink the sleeve onto the object) and apply pressure to the sleeve. In this case, it has been found that an air temperature of 300°–500° C. is effective with a minimum air pressure of 5 millibars at the sleeve face to ensure adequate bonding.

It is also conceivable that a water jet could be used to apply pressure to the plastics sleeve after it has been heat shrunk onto the object.

In the case of fence posts and ground engageable poles, it is only necessary to surround a part of the post with the plastics sleeve and the sealing solution. This may be a portion of the post intermediate it ends or it may be the entire lower portion of the post. It is not necessary to surround that portion of the post which will, in use, be disposed well above ground level.

The invention also resides in an object, such as a wooden fence post or ground engageable pole, protected by the aforesaid method.

DESCRIPTION OF THE PREFERRED EMBODIMENTS

In one example, a heat shrinkable thermoplastics sleeve (typically low or high density U.V. stabilised polyethylene or polyvinylchloride) is internally hot coated with a molten bituminous substance comprising one or more of the group comprising bitumen, tar, pitch, coal tar, asphalt or gilsonite, in straight or modified form. The bituminous substance should be sufficiently fluid to bond to the wooden object at a temperature lower than the temperature at which the thermoplastics sleeve is heat shrinkable. Bitumen has been found to be particularly suitable and typically the thickness of the bitumen solution is about 0.3 mm. The bituminous substance may include wood preservatives and/or adhesion promoters. It may also include fillers, extenders, plasticisers and/or elastomers. It may also include reinforcing fibres. However, the total of any wood preservative, adhesion promoters, fillers, extenders, plasticisers and elastomers preferably should not exceed 20% by weight. Indeed, if any wood preservative is to be used it may well be desirable to overcoat the bituminous substance with it.

The sleeve is preferably extruded and simultaneously internally hot coated with a molten bituminous substance. However, an extruded sleeve could be subsequently coated with bitumen. The sleeve could also be formed from a sheet of plastics material. In this case, opposite longitudinal edges of the sheet are overlapped and welded together. The sheet may be coated with a bituminous substance before or after forming into a sleeve.

The sleeve of thermoplastics material is preferably of sufficient thickness to be resistant to grass trimmers and animal attack and, typically, has a thickness of 100–600 microns, but can be thicker. It may be necessary to cool the other surface of the sleeve during hot coating with the bituminous substance to prevent the sleeve reaching a temperature at which shrinking will occur. Also, it may be desirable to pretreat the sleeve using corona discharge or a flame to improve adhesion of the bituminous substance to the film.

It has been found that a blend of 90% by weight of 85/40 oxidized grade bitumen (BS3690 Part 2 1994) and 10% by weight of stearic acid will operate satisfactorily over a temperature range of 0 to 55° C. without cracking at low temperatures and without sticking to itself or adjacent sleeves at higher temperatures provided the bituminous substance is coated with a soap solution as described in PCT/GB98/01168. As an alternative 105/35 oxidized grade bitumen (BS3690 Part 2 1994) can be used.

The sleeve is placed over the fence post (which may or may not be previously treated with conventional preservative) and positioned so that, when heat shrunk, it will encapsulate the required area of the post or pole.

In a preferred embodiment, the sleeve is firstly heat shrunk onto the fence post using infra-red heating and then pressure is applied to the sleeve using two pressure pads. The pads are pressed, for example, firstly against one pair of opposite faces of a post or pole having a square or rectangular or semi-cylindrical cross-section and then against the other pair of faces of the post or pole. The pads are typically formed of aluminium and are faced with compressible material, typically soft silicone rubber of about 15 Shore. The pads are heated to a temperature in the range of 150 to 200° C. and are pressed against the sleeve on the post or pole for about 10 seconds at a pressure typically in the region of 3000 kg/m$^2$. The temperature of the pads can raise the temperature of the bituminous substance above the temperature achieved during heat shrinking to ensure that it is in a sufficiently liquid state to intimately bond to the post. It has the added advantage that, if the post is wet, the water is evaporated thus ensuring that it does not prevent the bitumen from bonding to the post. It is, however, possible to press the sleeve against the post using the heated pressure pads and subsequently heat shrink the sleeve.

In one alternative embodiment, the sleeve is heated with a jet of hot air at an air temperature of 300°–500° C. The jet of air also applies pressure to the sleeve. The air pressure applied to the sleeve by the hot air should be at least 5 millibars.

In a further embodiment, the sleeve can be heated using infra-red heating to melt the bituminous substance and shrink the sleeve around the post. Pressure can then be applied using air at approximately room temperature to effect a bond between the bitumen and the post. Again, it has been found that the minimum effective pressure at the sleeve face is approximately 5 millibars to give adequate bonding.

In practice the application of air pressure is best achieved using an air knife fed by multi-stage blowers. The sleeve and post are rotated in front of the air jet to achieve a uniform bond and seal over the sleeve face.

This method has the added advantage of simultaneously cooling the bitumen allowing the sleeve post to be stacked immediately without the damaging the sleeve.

In yet a further embodiment unheated pressure pads could be brought into contact with the sleeve immediately after it has been heat shrunk onto the post. As before, the pads should be faced with a compressible material to allow for irregularities in the post and prevent puncturing the delicate hot sleeve.

In yet another embodiment, pressure could be applied to the sleeve after it has been heat shrunk onto the post using a water jet. This has the disadvantage that water could enter between the sleeve and post interface resulting in no bond or seal, but the method is nonetheless possible.

These methods may be applied to a heat shrinkable sleeve or a complete boot over the entire base of the post.

The sleeve, together with the bituminous substance, will prevent oxygen, micro-organisms, nitrogen and termites from the surrounding soil and air entering that portion of the post which has been encapsulated and will also greatly reduce the leaching of preservatives from the posts into the surrounding soil.

Also, the presence of the sleeve below ground effectively moves the entry point for moisture by the length of the sleeve below ground level. Thus, in the encapsulated area the moisture content is considerably lower than a non-encapsulated area. Depending on sleeve length and ground conditions, it is possible to reduce the moisture content below the 20% level needed for decay to occur within the encapsulated portion. The overall effect of the sleeve is to dramatically reduce the likelihood of decay and resultant premature post or pole failure.

A strap could be tied around the top and bottom of the sleeve where the sleeve is most vulnerable and/or the top and bottom of the sleeve could be folded into the remainder of the sleeve prior to heat shrinking. This will result in a higher clamping force at the top and bottom of the sleeve when the sleeve is heat shrunk.

The above method of encapsulation can also be used to protect other wooden objects in other applications.

The methods described above may also be used with meltable sealing solutions other than bitumen.

What is claimed is:

1. A method of protecting a wooden object, having a flat face, from decay, the method comprising the steps of firstly forming a heat shrinkable plastic sleeve and coating an inner surface of the sleeve with a meltable sealing solution prior to application of the sleeve to the object, subsequently applying the coated sleeve to a part of the object to be protected and heating the sleeve so as to heat shrink the sleeve onto the object and so as to melt the meltable sealing solution sufficiently for it to bond to the wooden object, and applying pressure to at least a portion of the sleeve that corresponds to the flat face of the wooden object.

2. A method as claimed in claim 1, wherein the meltable sealing solution is a bituminous substance.

3. A method as claimed in claim 2, wherein the bituminous substance includes wood preservatives and/or adhesion promoters.

4. A method as claimed in claim 1, wherein the sleeve is formed by extrusion.

5. A method as claimed in claim 4, wherein the sleeve is internally coated with the sealing solution as it is extruded.

6. A method as claimed in claim 1, wherein pressure pads are used to apply the pressure to the sleeve.

7. A method as claimed in claim 6, wherein the pressure pads are heated to an elevated temperature above room temperature.

8. A method as claimed in claim 6, wherein the pressure pads are formed of metal and are faced with compressible material.

9. A method as claimed in claim 1, wherein a jet of hot air is used to simultaneously heat the sleeve and apply the pressure to the sleeve.

10. A method as claimed in claim 1, wherein a water jet is used to apply the pressure to the plastic sleeve after the sleeve has been heat shrunk onto the object.

11. A method as claimed in claim 1, wherein pressurised air at substantially room temperature is used to apply the pressure to the plastic sleeve after the sleeve has been heat shrunk onto the object.

12. A method as claimed in claim 11, wherein the sleeve is heated to melt the sealing solution and shrink the sleeve onto the object using infra-red heating and the pressure is subsequently applied using air at substantially room temperature to effect the bond.

* * * * *